United States Patent

Howard et al.

Patent Number: 5,013,533
Date of Patent: May 7, 1991

[54] PROCESS FOR RECOVERING VALUABLE METALS FROM SPENT CATALYSTS

[76] Inventors: Robert A. Howard, #10 Dartmoor St., Sugarland, Tex. 77499; Wilson R. Barnes, 4111 Elderwood Dr., Seabrook, Tex. 77586

[21] Appl. No.: 486,797
[22] Filed: Mar. 1, 1990
[51] Int. Cl.$^5$ .............................................. C22B 4/00
[52] U.S. Cl. ................................... 423/133; 75/10.48
[58] Field of Search ...................... 423/133; 75/10.48

[56] References Cited
U.S. PATENT DOCUMENTS
4,029,495  6/1977  Hirayama .......................... 75/10.48

Primary Examiner—Peter D. Rosenberg
Attorney, Agent, or Firm—Pravel, Gambrell, Hewitt, Kimball & Kimball

[57] ABSTRACT

A process for recovering heavy metals from spent catalysts on an alumina support material comprising calcining the catalyst feed material to remove impurities and smelting the calcined feed in an electric arc furnace, preferably with scrap iron. A reducing agent, such as natural gas, is injected into the furnace to reduce the heavy metals to their metallic states. The reduced metals form an alloy and separate from the alumina by gravity.

21 Claims, 1 Drawing Sheet

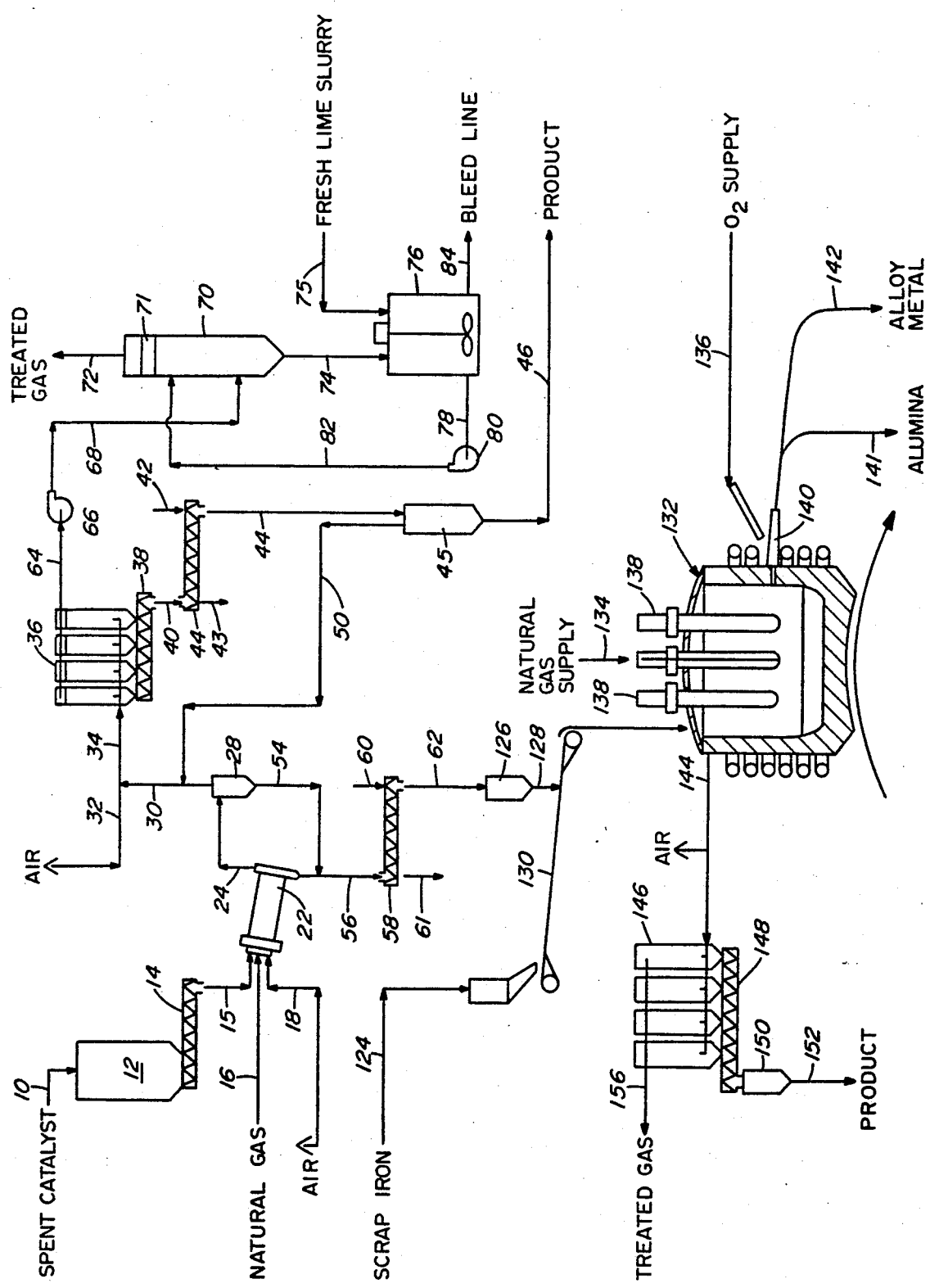

PROCESS FOR RECOVERING VALUABLE METALS FROM SPENT CATALYSTS

FIELD OF THE INVENTION

This process relates to a method for recovering valuable metals from spent catalysts. More particularly, it relates to a process for recovering metals, such as molybdenum, vanadium, nickel and cobalt, from spent catalysts on an oxide support material, such as alumina.

BACKGROUND OF THE INVENTION

It is well known that certain treatments of petroleum, e.g., hydrogenation desulfurization, require the use of certain types of catalysts. Typical catalysts for hydrogenation desulfurization of the heavy crudes are based on molybdenum oxide combined with oxides of cobalt or nickel, all sulfidized on a porous alumina support material. The particular catalysts are deposited on the carrier and are used to remove sulfur, oxygen and nitrogen from petroleum. During the desulfurization process, heavy metals such as vanadium and nickel, as well as carbon, sulfur and other contaminants originating in the heavy oil, deposit on the catalyst until the catalyst wears out and loses activity. Such a worn out catalyst, commonly known as a spent catalyst, must be replaced with a new charge of a fresh catalyst to continue the reaction.

In the past, spent catalysts were usually deposited in landfills, but this method has become increasingly expensive and undesirable because of environmental restrictions and liabilities. In addition, there is a considerable amount of valuable heavy metals which are being discarded.

Several processes have been proposed which relate to the recovery of such heavy metals. These methods basically use the extraction of the heavy metals with an aqueous acid or an alkali solution. Usually, the spent catalyst is calcined and oxidized at a relatively high temperature of 500° C. or higher before extraction with an acid or alkali. This calcination process converts all of the heavy metals to the oxide forms which are readily decomposable and extractable by acid or alkali. Other processes comprise leaching to remove the catalytic material by chemically combining it with another material in the gaseous or liquid phase. Still other processes involve melting the catalyst material and mechanically separating the alumina containing melt component from the metal alloy residue.

None of these processes is entirely satisfactory, primarily due to the high volume of catalyst support needed for processing relative to the low volume of valuable metals recovered. In many cases, the economics of the recovery process do not justify recovering the valuable metals from the spent catalyst even though the total amount of valuable metals is significant. There still exists a need in the industry for an efficient process that economically recovers substantially all of the valuable metals from spent catalysts and eliminates the environmental problems caused by the disposal of spent catalysts.

SUMMARY OF THE INVENTION

This invention relates to an economical process for recovering substantially all of the low concentrations of valuable heavy metals from catalysts on oxide support material, such as alumina. The process also eliminates the need to dispose of the spent catalysts.

The process consists of two sequential steps—calcining and smelting. In the first step, the spent catalyst is calcined under oxidizing conditions at a temperature from about 1400° F. (760° C.) to about 1600° F. (870° C.) to remove sulfur, free carbon, water and hydrocarbons. In this step, various amounts of molybdenum are volatilized as molybdenum trioxide ($MoO_3$). The gases from this calcining step are cooled and molybdic trioxide may be captured as a salable product by any known means, such as a bag filter.

In the next step, the calcine from the calcining step is smelted, preferably with a material, such as scrap iron. The smelt takes place in a furnace, such as an electric arc furnace, at temperatures from about 3000° F. (1650° C.) to about 4500° F. (2400° C.), preferably at about 4000° F. (2200° C.). The molybdenum remaining from the calcining step is volatilized as molybdic trioxide and may be collected in a bag filter. Once the molybdenum is removed, a reducing agent, such as carbon, coke, hydrocarbon gas or mixtures thereof, is injected into the furnace to reduce the oxides of vanadium and cobalt/nickel to the metallic state. Also, oxygen may be lanced into the furnace to improve the appearance of the alumina. The alumina and heavy metal phases separate by gravity, and each may be tapped into molds.

BRIEF DESCRIPTION OF THE DRAWING

The FIGURE is a schematic diagram of the calcining and smelting steps.

DETAILED DESCRIPTION OF THE INVENTION

This invention relates to a method for processing spent catalysts to separate the valuable heavy metals contained in the catalysts or adhered to the catalysts from the catalyst support materials that make up the bulk of the spent catalysts. For clarity, reference will be made to the FIGURE, but it is to be understood that the invention is not limited to the particular embodiment shown in the FIGURE.

In the preferred embodiment, the process involves two sequential steps, each designed to maximize the efficiency of the process. In the initial step, the spent catalyst is calcined to remove sulfur, free carbon, water and hydrocarbons and to volatilize molybdenum. Preferably, the calcining step is performed in a rotary kiln that has two operating zones—a preheating zone and a reaction zone. Referring to the FIGURE, the spent catalyst enters the storage bin 12 through the feed line 10 and is removed from the storage bin 12 by means of a screw feeder 14. The spent catalyst is transported through line 15 to the rotary kiln 22.

In the preheating zone of the kiln, the catalysts and gases are heated to approximately 350° F. (177° C.). The energy is supplied by a natural gas burner at the feed end of the kiln through line 16. In this zone, water is vaporized and light hydrocarbons are volatilized and burned.

Sulfur, carbon and hydrocarbons are burned off in the reaction zone of the kiln, and molybdenum is oxidized to form the volatile trioxide. During this calcining step air enters the feed end of the kiln through line 18 and provides oxygen for the calcining reaction. The temperature of the reaction zone should be maintained from about 1400° F. (760° C.) to about 1600° F. (870° C.), preferably at about 1500° F. (815° C.). The oxygen in the air also maintains oxidizing conditions in the exhaust gases which require ample oxygen to complete the combustion.

The sulfur and carbon contents of the catalysts vary widely. For example, catalysts with a high carbon and sulfur content may require a secondary source of air to prevent the reaction zone temperature from exceeding about 1600° F. (870° C.). Catalysts with a low carbon and sulfur content may require that additional heat be generated in both the preheating and the reaction zones. However, even under these conditions air or even oxygen enriched air may still be required to oxidize the exhaust gases.

Molybdic trioxide volatilizes slightly at temperatures as low as 1000° F. (540° C.) and strongly at temperatures above 1200° F. (650° C.). Therefore, in the reaction zone, which is from about 1400° F. to about 1600° F., at least part of the molybdic oxide will volatilize. Various amounts of the molybdenum in the feed are volatilized in the reaction zone of this calcining step.

The gases produced from the feed during the calcining step exit the kiln through line 24 and may contain a significant amount of calcine. In order to recover this material, the gases pass through a cyclone 28 where the calcine is collected for feed to the smelting operation. This calcine is returned to the process through line 54 and becomes feed for the smelting step.

In the preferred embodiment, the gases from the calcining step exit the cyclone 28 through line 30 and pass through two additional cleaning stages. In the first stage, the gases pass into a bag filter 36 and are cooled to about 500° F. with tempering air from line 32. Lowering the temperature of the gas causes the molybdic trioxide to condense. The gas passes through a bag filter 36, and the solids are collected. The solids contain some calcine dust and condensed molybdic trioxide. The solids exit the bag filter onto screw conveyer 38 and are further cooled in bag dust cooler 44 by water circulating in through line 42 and out through line 43. The cooled product enters bag house dust bin 45 for storage. Any gases or dust generated during the loading operation may be returned to line 30 through line 50. The product collected from the bag filter exits the dust bin 45 through line 46 and may be sold based on molybdenum content.

The gases exiting the filter bag 36 through line 64 usually contain oxides of sulfur. They can be easily desulfurized by absorption in an alkaline slurry, such as lime. Preferably, the slurry consists of calcium sulfite and calcium sulfate salts, unreacted lime and water. The hot gases in line 64 pass through a fan 66 and enter a spray absorber 70 through line 68. In the spray absorber 70, the gases come in contact with a spray of circulating slurry droplets entering through line 82. The oxides of sulfur react with the slurry to form insoluble calcium salts. As the lime is consumed, fresh lime slurry is added through line 75 to the reaction/circulation tank 76 for makeup and pH control. The sulfite/sulfate by-product is bled from the reaction/circulation tank 76 through line 84 and may be sent to a pond for de-watering.

A mist eliminator 71 is located above the absorption zone of the spray tower 70 to remove entrained liquid droplets by means of impingement. This embodiment is based on a desulfurization process to treat gases that contain primarily $SO_2$. If the sulfur is in the form of $SO_3$, other process steps and facilities may be used, e.g., electrostatic precipitator. The filtered gases from the spray tower 70 exit through line 72.

Formation of the lime slurry used in this process can be accomplished by any known means in the art. For example, if pebble lime is used, a slaker will convert the dry calcium oxide to calcium hydroxide. By regulating the mix of lime and water under controlled conditions of agitation and temperature, soft hydrated particles of alkaline material may be formed. This slurry enters reaction/circulating slurry tank 76 through line 75. This part of the process, which involves scrubbing the gas to remove sulphur, is well known in the art and is not considered to be an integral part of this invention.

The next critical step of this process involves the smelting step to separate the valuable heavy metals from the calcined catalyst support materials. The feed for this smelting operation is the calcine from the rotary kiln calcining step and the recovered calcine from the gases generated in the calcining operation. This material, which enters through line 62, consists essentially of the alumina catalyst support material and the heavy metals of molybdenum, cobalt/nickel and vanadium. The calcine feed is stored in a batch bin 126 and exits through line 128. It is charged on a batch basis to an electric arc furnace 132. In the preferred embodiment, a material such as scrap iron is also charged along with the calcine. The scrap iron enters through line 124 and is combined with the calcine feed in line 130.

The iron helps to lower the melting point of the metal alloy in the metal phase and also helps to carry the metals out of the alumina slag phase in the furnace 132. Enough iron is added to equal from about 5% to about 15%, preferably about 10%, of the total metals in the metal phase. This charge is melted at a temperature from about 3000° F. (1650° C.) to about 4500° F. (2480° C.), preferably at about 4000° F. (2200° C), by electrical current through electrodes 138. During this melt, the remaining molybdenum volatilizes as the trioxide and exits with the furnace gas through line 144. A reducing agent, such carbon, coke or a hydrocarbon gas, e.g., natural gas, is injected into the furnace through line 134 to reduce the oxides of vanadium and nickel or cobalt to the metallic stage. Natural gas is the preferred reducing agent.

The heavy metals in the metallic state form an alloy. The alumina (slag) and alloy of heavy metals may be easily separated by gravity. The alumina phase may be lanced with oxygen injected through line 136 to improve its final appearance. The alumina 141 is periodically removed from the furnace by pouring it from spout 140 into molds. A new charge is added to the furnace and the same procedure is repeated. Because of the large volume of alumina relative to the valuable heavy metals, several charges are added before enough valuable heavy metal 142 accumulates in the bottom of the furnace to tap it into molds.

The gases in line 144 from the furnace are mixed with sufficient air to ensure that all gaseous products are fully oxidized. These gases are cooled, preferably with tempering air, to condense the molybdic trioxide as in the calcining step. These gases pass to a bag filter 146 for collection of the molybdic trioxide The gases from the bag filter are removed through line 156 and the solids are collected in a dust bin 150 for eventual loading and shipment through line 152. The alumina material removed from the furnace may be processed in any manner desired, such as crushing and grinding.

It should be noted that the composition of spent catalyst varies considerably between manufacturers. Furthermore, the different use conditions cause the composition to vary even more. Therefore, the actual composition of the spent catalyst cannot be specified with certainty. Table 1 illustrates the material balance at various points in the process. This specific example assumes a spent catalyst having the following average composition after removal of water and hydrocarbons:
  vanadium—5%;
  molybdenum—8% (12% as $MoO_3$);
  nickel or cobalt—3.2% (4% as NiO or CoO);
  iron—0.2%;
  phosphorus—3%;
  sulfur—6%;
  carbon—15%
  silica—0.5%.

The typical catalyst contains either nickel or cobalt, and either will function in this process. This process is expected to recover about 99% of the valuable heavy metals present in the spent catalyst.

calcining the spent catalysts under oxidizing conditions at a temperature of from about 1400° F. to about 1600° F. to produce calcine feed for an electric arc furnace;

smelting the feed in the electric arc furnace at a temperature of from about 3000° F. to about 4500° F. to form molten alumina and molten heavy metals;

forming an alloy of molten heavy metals by reducing the molten heavy metals to a metallic state; and separating the molten alumina from the alloy of molten heavy metals.

2. The process of claim 1 wherein air is injected into the calcining step to maintain oxidizing conditions.

3. The process of claim 1 further comprising volatilizing molybdenum in the calcining step.

4. The process of claim 3 further comprising recovering volatilized molybdenum from the calcining step.

5. The process of claim 1 further comprising adding to the electric arc furnace an amount of iron ranging from about 5% to about 15% by weight to the heavy metals in the feed.

6. The process of claim 1 further comprising volatilizing molybdenum in the smelting step.

7. The process of claim 6 further comprising recovering volatilized molybdenum from the smelting step.

TABLE 1

| STREAM NUMBER | STREAM NAME | | V | Mo | Ni/Co | P | S* | C | $SiO_2$ | $Al_2O_3$ | Fe | WATER/ HYDROCARBON | CALCIUM SULFITE SULFATE HYDRATE | TOTAL** |
|---|---|---|---|---|---|---|---|---|---|---|---|---|---|---|
| 10 | KILN FEED (DRY BASIS) | TPY % | 645 5.0 | 1032 8.0 | 413 3.2 | 387 3.0 | 774 6.0 | 1934 15.0 | 64 0.5 | 6232 48.3 | 26 0.2 | | | 12896 89.2 |
| 10 | KILN FEED (WET BASIS) | TPY % | 645 4.6 | 1032 7.3 | 413 2.9 | 387 2.7 | 774 5.5 | 1934 13.7 | 64 0.5 | 6232 44.0 | 26 0.2 | 1275 9 | | 14171 90.4 |
| 44 | BAGFILTER DUST | TPY % | 31 2.4 | 540 41.5 | 20 1.5 | 18 1.4 | | | 3 0.2 | 359 27.6 | 1 0.1 | | | 1302 74.7 |
| 84 | MATERIAL IMPOUNDED | TPY % | 6 0.04 | 10 0.04 | 4 0.03 | 4 0.03 | | | 0.5 | 76 0.5 | 0.3 | 11947 75 | 3869 24.3 | 15928 99.9 |
| 62 | CALCINE | TPY % | 608 6.6 | 482 5.2 | 389 4.2 | 365 4.0 | | | 61 0.7 | 5888 63.7 | 24 0.3 | | | 9225 84.7 |
| 152 | BAGFILTER DUST | TPY % | 3 0.4 | 462 62.3 | 2 0.3 | 2 0.3 | | | | 36 4.9 | | | | 742 68.2 |
| 141 | ALUMINA PHASE | TPY % | 12 0.2 | 10 0.2 | 8 0.1 | 357 5.4 | | | 60 0.9 | 5744 86.1 | | | | 6674 92.9 |
| 142 | METAL PHASE | TPY % | 593 49.2 | 10 0.8 | 379 31.4 | 6 0.5 | | | 1 0.1 | 108 9.0 | 109 9.0 | | | 1206 100 |
| 124 | CAST IRON | TPY % | | | | | | | | | 85 100 | | | 85 100 |
| 75 | LIME | TPY % | | | | | | | | | | | | 1625 100 |

*Sulfur is treated as being a metallic sulfide.
**Total weights include contribution by oxygen from the metallic oxides.

The principle of the invention and the best mode contemplated for applying that principle have been described. It is to be understood that the foregoing is illustrative only in that other means and techniques can be employed without departing from the true scope of the invention defined in the following claims.

We claim:

1. A process for recovering heavy metals and alumina from spent catalysts comprising:

8. The process of claim 1 wherein the molten heavy metals are reduced to a metallic state by injecting a reducing agent into the electric arc furnace.

9. The process of claim 8 wherein the reducing agent is hydrocarbon gas, carbon or coke or mixtures thereof.

10. The process of claim 9 wherein the reducing agent is natural gas.

11. The process of claim 1 further comprising lancing oxygen into the molten alumina in the electric arc furnace.

12. The process of claim 1 wherein the molten alumina and alloy of molten heavy metals are separated in the electric arc furnace by gravity.

13. A process for recovering heavy metals and alumina from spent catalysts comprising:
  calcining the spent catalysts under oxidizing conditions at temperatures from about 1400° F. to about 1600° F. to produce calcine for feed to an electric arc furnace;
  feeding the calcine to the electric arc furnace;
  adding to the electric arc furnace an amount of iron ranging from about 5% to about 15% by weight to heavy metals in the calcine feed;
  smelting the feed in the electric arc furnace at a temperature of from about 3000° F. to about 4500° F. to form molten heavy metals and molten alumina;
  injecting a reducing agent into the electric arc furnace, thereby reducing the molten heavy metals to a metallic state and forming an alloy of molten heavy metals; and
  separating the molten alumina from the alloy of heavy metals by gravity.

14. The process of claim 13 wherein air is injected into the calcining step to maintain oxidizing conditions.

15. The process of claim 13 further comprising volatilizing molybdenum in the calcining step.

16. The process of claim 15 further comprising recovering volatilized molybdenum from the calcining step.

17. The process of claim 13 further comprising volatilizing molybdenum in the smelting step.

18. The process of claim 17 further comprising recovering volatilized molybdenum from the smelting step.

19. The process of claim 13 wherein the reducing agent is natural gas.

20. The process of claim 13 further comprising lancing oxygen into the molten alumina in the electric arc furnace.

21. A process for recovering heavy metals and alumina from spent catalysts comprising:
  calcining the spent catalysts under oxidizing conditions at temperatures from about 1400° F. to about 1600° F. to produce calcine for feed to an electric arc furnace and to volatilize molybdenum in an exhaust gas;
  recovering the volatilized molybdenum in the exhaust gas from the calcining step;
  feeding the calcine to the electric arc furnace;
  adding to the electric arc furnace an amount of iron ranging from about 5% to about 15% by weight to heavy metals in the calcine feed;
  smelting the feed in the electric arc furnace at a temperature of from about 3000° F. to about 4500° F. to form molten heavy metals and molten alumina and to volatilize molybdenum in an exhaust gas;
  recovering the volatilized molybdenum in the exhaust gas from the smelting step;
  injecting a reducing agent into the electric arc furnace, thereby reducing the molten heavy metals to a metallic state and forming an alloy of molten heavy metals; and
  separating the molten alumina from the alloy of heavy metals by gravity.

* * * * *